(12) United States Patent
Fielder

(10) Patent No.: US 7,348,686 B2
(45) Date of Patent: Mar. 25, 2008

(54) BUOYANT ROTOR

(76) Inventor: William Sheridan Fielder, P.O. Box 1221, Ojai, CA (US) 93024-1221

( * ) Notice: Subject to any disclaimer, the term of this patent is extended or adjusted under 35 U.S.C. 154(b) by 79 days.

(21) Appl. No.: 11/364,616

(22) Filed: Feb. 27, 2006

(65) Prior Publication Data

US 2006/0192387 A1 Aug. 31, 2006

Related U.S. Application Data

(60) Provisional application No. 60/714,711, filed on Sep. 6, 2005, provisional application No. 60/702,792, filed on Jul. 26, 2005, provisional application No. 60/700,421, filed on Jul. 18, 2005, provisional application No. 60/694,503, filed on Jun. 27, 2005, provisional application No. 60/657,507, filed on Feb. 28, 2005.

(51) Int. Cl.
*F03D 3/04* (2006.01)
(52) U.S. Cl. .......................................... 290/54; 290/43
(58) Field of Classification Search ................. 290/42, 290/43, 44, 52, 53, 54, 55; 415/3.1, 7; 416/17, 416/108
See application file for complete search history.

(56) References Cited

U.S. PATENT DOCUMENTS

| | | | |
|---|---|---|---|
| 3,934,948 A | | 1/1976 | Pruvot |
| 3,986,787 A | * | 10/1976 | Mouton et al. ................. 415/7 |
| 4,163,904 A | * | 8/1979 | Skendrovic ................... 290/54 |
| 4,335,319 A | * | 6/1982 | Mettersheimer, Jr. ........ 290/54 |
| 4,748,808 A | * | 6/1988 | Hill ............................. 60/398 |
| 5,491,366 A | * | 2/1996 | Newman ..................... 290/53 |
| 5,493,855 A | | 2/1996 | Walters et al. |
| 6,109,863 A | * | 8/2000 | Milliken ........................ 415/1 |
| 6,551,053 B1 | * | 4/2003 | Schuetz ...................... 415/3.1 |
| 6,616,403 B1 | * | 9/2003 | Smith et al. ................. 415/3.1 |
| 6,658,083 B2 | | 12/2003 | Sai |
| 6,880,976 B2 | | 4/2005 | Huang et al. |
| 6,995,479 B2 | * | 2/2006 | Tharp ........................... 290/54 |
| 7,235,893 B2 | * | 6/2007 | Platt ............................. 290/54 |

* cited by examiner

*Primary Examiner*—Nicholas Ponomarenko

(57) ABSTRACT

A buoyancy means and apparatus for reducing friction in rotational devices, particularly electric generators and or turbines. This feature is critical in hydroelectric power plants and ocean energy projects where the rotating weights are significant. Flotation devices are affixed to rotational devices and submerged into a heavy fluid encased within a chamber that does not interfere with the normal operation of the said rotational device. Vibration is also reduced, allowing for more precise operation and a longer life cycle for moving parts.

20 Claims, 4 Drawing Sheets

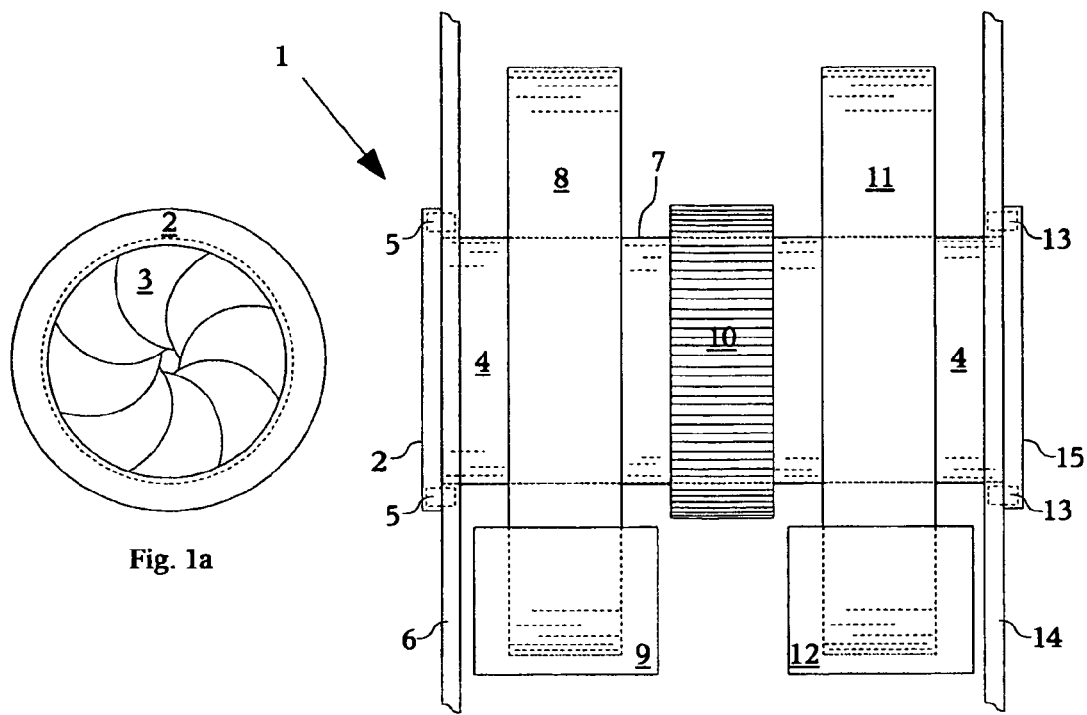
Fig. 1a
Fig. 1
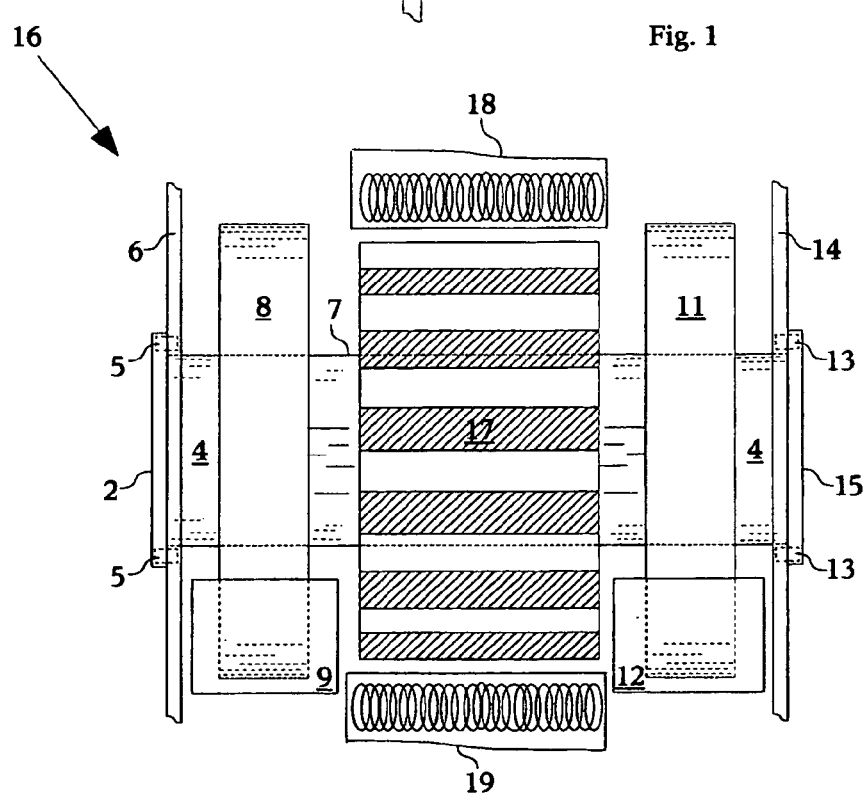
Fig. 2

BUOYANT ROTOR

CROSS-REFERENCE TO RELATED APPLICATIONS:

This application claims the benefit of provisional patent applications:

Ser. No. 60/657,507, filed Feb. 28, 2005 by the present inventor,

Ser. No. 60/694,503, filed Jun. 27, 2005 by the present inventor,

Ser. No. 60/700,421, filed Jul. 18, 2005 by the present inventor,

Ser. No. 60/702,792, filed Jul. 26, 2005 by the present inventor,

Ser. No. 60/714,711, filed Sep. 6, 2005 by the present inventor.

FEDERALLY SPONSORED RESEARCH

None.

SEQUENCE LISTING

None.

BACKGROUND OF THE INVENTION—FIELD OF INVENTION

This invention generally relates to hydroelectric power plants, specifically to electric generators, turbines, and electric motors.

BACKGROUND OF THE INVENTION—PRIOR ART

Traditionally devices that generate or utilize rotational energy lose efficiency from friction. Hydrostatic bearings provide some relief, but fall short of entirely supporting rotors in electric power plants.

BACKGROUND OF THE INVENTION—OBJECTS AND ADVANTAGES

Accordingly, objects and advantages of the invention include efficiency gains realized by applying buoyancy devices to apparatus that rely on and or generate rotational energy. Buoyancy devices reduce the amount of friction, thus creating less drag than the use of bearings alone. An optimal micro surface can be achieved on the floatation devices by utilizing special coatings that provide a much better hydrodynamic profile. As a result, power plants may increase the size of the magnets they incorporate in their rotors, that will in turn, generate more electric current. Electric motors, pumps, and turbines all benefit from buoyancy devices.

This invention uses bearings, perhaps magnetic or hydrostatic, as placeholders rather than as a means to entirely suspend the rotor.

Another advantage is vibration reduction, allowing for a more precise operation and a longer life cycle for moving parts.

Further objects and advantages will become apparent from a consideration of the ensuing description and drawings.

SUMMARY

Standard electric generators, motors, and turbines lose valuable rotational energy as a result of gravity induced friction. This invention minimizes these effects by providing a means to suspend these devices in a bath of heavy fluid while still permitting the device to rotate freely. An optimal micro surface can be achieved on the floatation devices by utilizing special coatings that provide a much better hydrodynamic profile than bearings alone. Higher efficiencies from reduced friction allow for the use of larger magnets that generate more electric current.

Vibration is also reduced allowing for more precise operation and longer life cycles for moving parts.

DRAWINGS

FIG. 1 depicts a turbine that incorporates buoyancy devices mounted on the rotor.

FIG. 2 is an illustration of an electric generator that incorporates buoyancy devices attached to the rotor.

Figure 5B:
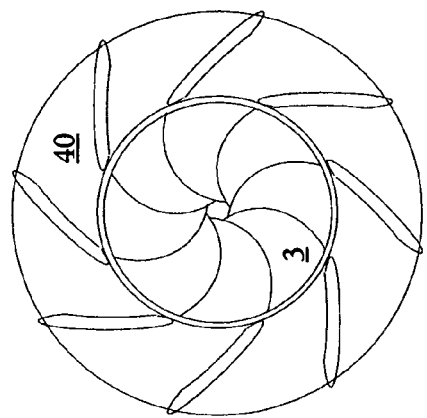
Figure 5:
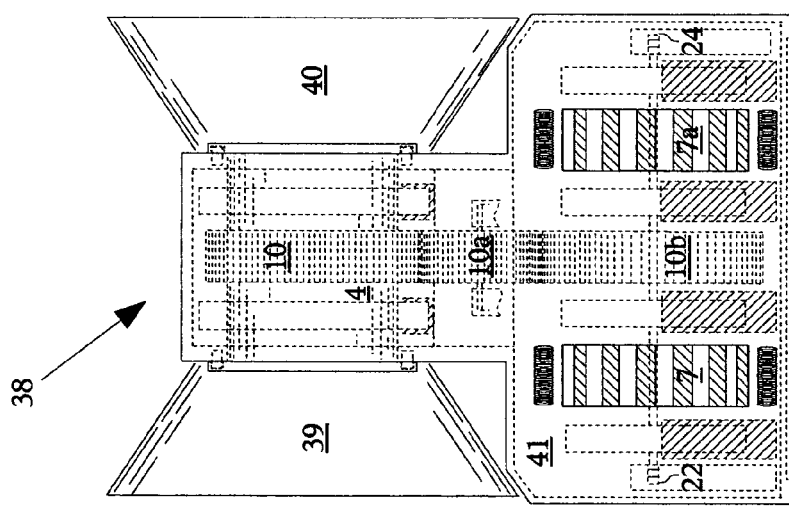
Figure 5A:
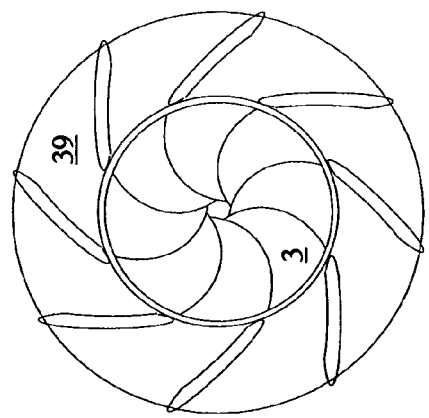

FIG. 5 illustrates a front view of an offshore electric power plant suitable for tidal applications. Buoyancy devices are attached to the turbine's cylinder as well as to the axle of the two electric generators. FIGS. 5a and 5b are side views of a Hollow Turbine with directional funnels.

Figure 6:
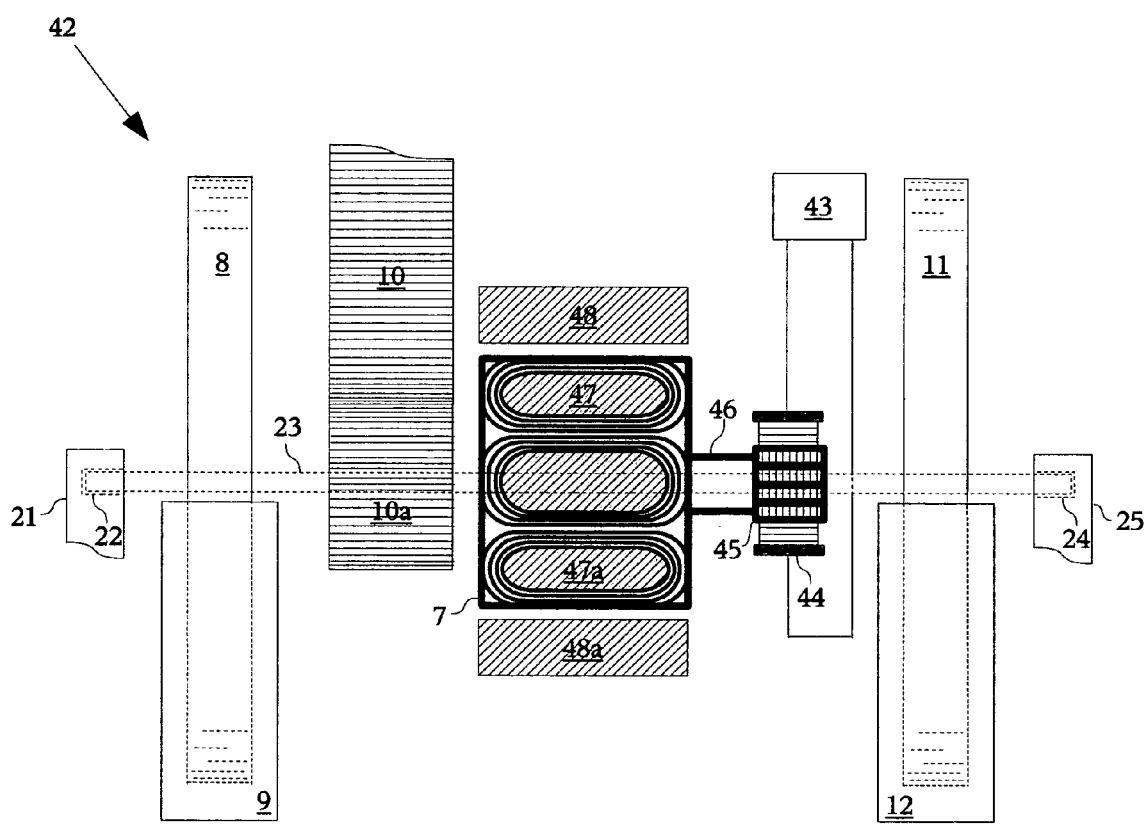

FIG. 6 depicts an electric motor that incorporates buoyancy devices.

REFERENCE NUMERALS

1 Buoyant Turbine
2 left side turbine shroud
3 turbine blades
4 outside turbine cylinder wall
5 left side turbine circular bearing
6 left side turbine support structure
7,7a rotor(s)
8 left side flotation device
9 left side flotation chamber
10, 10a 10b rotational energy connecting element(s)
11 right side flotation device
12 right side flotation chamber
13 right side turbine circular bearing
14 right side turbine support structure
15 right side turbine shroud
16 Buoyant Hollow Generator
17 rotor magnet
18 top stator
19 bottom stator
20 Buoyant Rotor
21 left side support structure
22 left side rotor bearing
23 axle
24 right side rotor bearing
25 right side support structure
26 Vertical Buoyant Rotor
27 upper support structure
28 top side rotor bearing
29 vertical axle
30 vertical rotor
31 left stator 32 right stator
33 turbine
34 flotation device
35 flotation chamber
36 bottom side rotor bearing
37 bottom support structure
38 Electric power plant. suitable for tidal applications.
39 left side directional funnel
40 right side directional funnel
41 submerged airtight structure
42 Buoyant Motor
43 electric current input
44 motor brush, electric conductor
45 communicator-armature/motor brush connector
46 electric conductor
47, 47a electromagnet(s)
48, 48b stationary magnet(s)

DETAILED DESCRIPTION - FIG. 1:

FIG. 1 is a view of a Buoyant Turbine 1 that is suspended by buoyancy devices 8 and 11 in flotation chambers 9 and 12. The buoyancy devices 8 and 11 are attached to the outer surface of the turbine cylinder wall 4 at the outer sides of said turbine in between the rotary connecting element 10 and the outer ends of said turbine.

The buoyancy devices 8 and 11 are the inner tube variety and may be hollow or contain a substance that is lighter than water. The shells of the buoyancy devices 8 and 11 may be constructed from composite materials. aluminum, or even a steel alloy. An optimal micro surface can be achieved by utilizing special coatings on the flotation devices providing a much better hydrodynamic profile.

The flotation chambers 9 and 12 may be embedded within the structure of the generating station or stand alone.

The flotation chambers 5 may be embedded within the structure of the generating station or stand alone and contain fluids such as oil or mercury.

OPERATION—FIG. 1

The flotation chambers 9 and 12 are filled with a heavy fluid to a point at which the weight of the device is minimized. The attached buoyancy devices 8 and 11 floating in vessels 9 and 12 exert upward pressure on the turbine cylinder 4 that reduces the load on the bearings 5 and 13.

Operation of the Buoyant Turbine 1 is the same as conventional hydraulic turbine installations where kinetic energy is captured from passing water and converted into rotational energy.

Operation of the electric generator 1 is the same as in conventional power plants, where rotational energy is converted into electricity by alternating magnetic fields produced by the rotor 6 spinning adjacent to the stationary electric conductors 7.

DETAILED DESCRIPTION—FIG. 2

FIG. 2 illustrates a Buoyant Hollow Generator 16 with attached buoyancy means 8 and 11 that are submerged in a heavy fluid in the chambers 9 and 12 and rotate on bearings 5 and 13. Turbine blades 3, as depicted in FIG. 1a, capture kinetic energy that provides the rotational energy for the generator.

OPERATION—FIG. 2

As in a typical hydroelectric power plant, moving water enters the turbine/generator 16 and forces the turbine's blades 3 to rotate on bearings 5 and 13. Attached buoyancy devices 8 and 11 floating in the vessels 9 and 12 exert upward pressure on the Buoyant Hollow Generator 16, thus reducing the load on the bearings 5 and 13, which permits larger magnets to be installed.

DETAILED DESCRIPTION—FIG. 3

Figure 3:
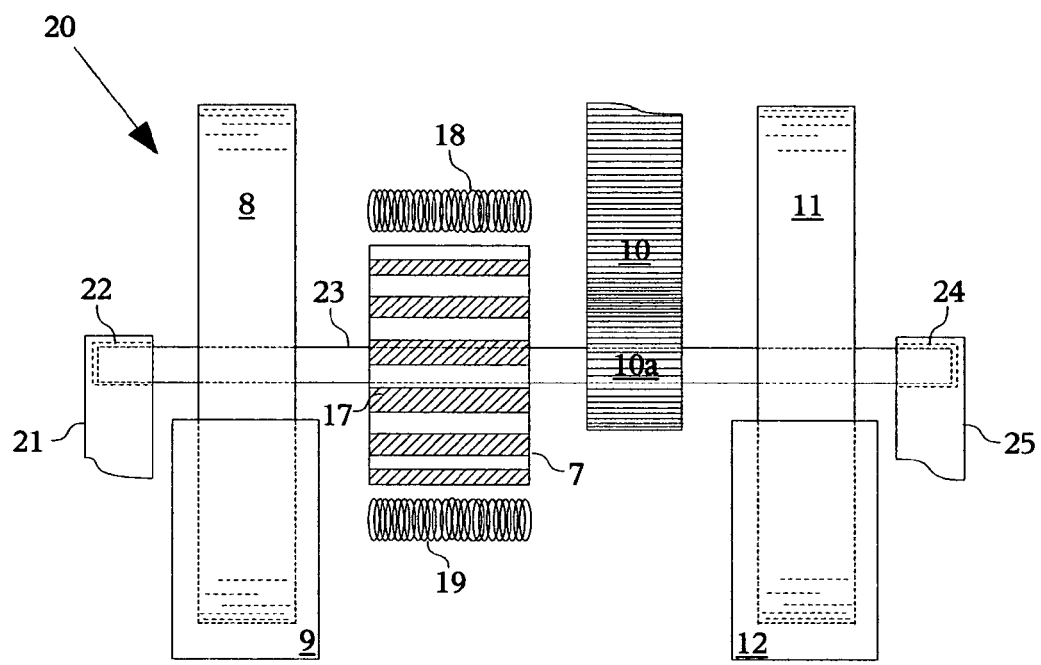
FIG. 3 depicts a horizontally mounted electric generator that incorporates buoyancy devices. Not shown is the rotational energy source.

FIG. 3 shows buoyancy devices 8 and 11, similar in shape to a tire's inner tube, affixed around the axle 23 located at the axis of rotation of a horizontally mounted electric generator's rotor 7 and stators 18 and 19, in between the outer bearing means 22 and 24. The buoyancy devices 8 and 11 float on a heavy liquid in chambers 9 and 12 located directly beneath said buoyancy devices 8 and 11 and positioned in such a manner as to not interfere with the operation of the rotor 7 and stators 18 and 19, and rotational energy connecting elements 10 and 10a.

The buoyancy devices 8 and 11 may be hollow or contain a substance that is substantially lighter than the heavy fluid in the vessels 9 and 12. The shells of the buoyancy devices 8 and 11 may be constructed from composite materials, aluminum or even a steel alloy. An optimal micro surface, not shown, can be achieved by utilizing special coatings, perhaps nano technology based, on the buoyancy devices, providing a much better hydrodynamic profile.

The flotation chambers 9 and 12 may be embedded within the structure of the generating station or stand alone and contain fluids such as oil.

OPERATION—FIG. 3

In FIG. 3 the flotation chambers 9 and 12 are filled with a heavy fluid to a point at which the weight of the axle 23. together with its attachments, is minimized by the buoyancy of the flotation devices 8 and 11. Attached buoyancy devices 8 and 11 floating in vessels 9 and 12 exert upward pressure on the axle 23 that reduces the load on the bearings 22 and 24. This permits larger magnets to be installed on the rotor 7, which results in more electric current being generated in the stators 18 and 19. Rotational energy is applied to the axle 23 from rotational energy connecting elements 10 and 10a. The spinning axle 23 exerts less pressure on the bearings 22 and 24 than the drag produced by the spinning flotation devices 8 and ii in the flotation chambers 9 and 12.

Operation of the Buoyant Rotor 20 is the same as in conventional vower plants, where rotational energy is converted into electricity by alternating magnetic fields produced by the rotor 7 spinning adjacent to the stators 18 and 19.

DETAILED DESCRIPTION—FIG. 4

Figure 4:
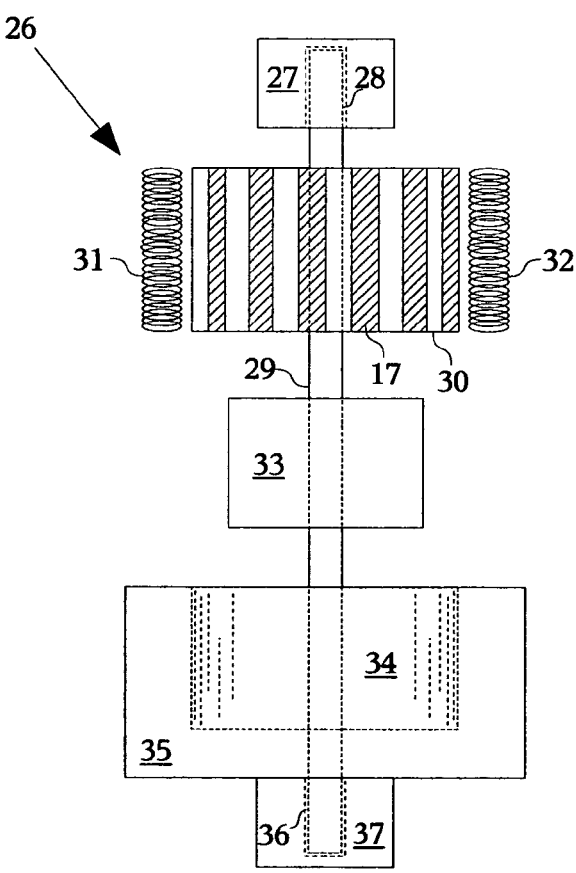
FIG. 4 shows a vertically mounted electric generator that incorporates buoyancy devices.

FIG. 4 depicts a buoyancy device 34 similar in shape to a disk and affixed around the central axle 29 located at the axis of rotation of a vertically mounted electric generator comprising a rotor 30 and stators 31 and 32. The said buoyancy disk 34 is located on the axle 29 beneath the turbine 33 and above the bottom bearing 36. It could also be located above the turbine 33. The buoyancy device 34 floats inside the chamber 35 located directly beneath said buoyancy device 34.

The flotation chambers 35 may be embedded within the structure of the generating station or stand alone.

OPERATION—FIG. 4

As seen in FIG. 4, a flotation chamber 35 is filled with a heavy fluid to a point at which the weight of the Vertical Buoyant Rotor 26 is minimized by the buoyancy of the flotation device 34. The attached buoyancy device 34 floating in the vessel 35 exerts upward pressure on the shaft 29 that reduces the load on the lower bearing 36, allowing larger magnets to be installed on the rotor 7, resulting in more electric current being generated.

Operation of the electric generator is the same as in conventional power plants where rotational energy derived from a turbine 33 is converted into electricity by an alternating magnetic field generated by the rotor 7 adjacent to the stators 31 and 32.

DETAILED DESCRIPTION—FIGS. 5, 5a, and 5b

FIG. 5 is a cross-sectional view of an electric power plant that houses one Buoyant Turbine suspended by buoyancy means in flotation chambers and connected to rotors 7 and 7a by rotational energy connecting elements 10, 10a, and 10b. Bearings 22 and 24 act as placeholders since the weight of the apparatus is mostly supported by the buoyancy means. Rotors 7 and 7a are affixed to the axle that also accommodates flotation devices and a rotational energy connecting element 10b that rotates freely on bearings 22 and 24.

FIGS. 5a and 5b depict side views of a Hollow Turbine, turbine blades 3, and directional funnels 39 and 40. as mounted within the power plant.

OPERATION—FIG. 5

As in a typical hydroelectric power plant, moving water enters the turbine, in FIG. 5, and forces the turbine's blades 3 to rotate on its bearings. Rotational energy is transferred from the turbine to the electric generator's rotors 7 and 7a on an axle via rotational energy connecting elements 10, 10a, and 10b, generating electric current in the stators. Flotation devices rotate with the rotors 7 and 7a on the shaft and are submerged in a heavy fluid in flotation chambers. Attached buoyancy devices floating in the vessels exert upward pressure on the shaft and turbine that reduces the load on the bearings 22 and 24, which permits larger magnets to be installed on the rotors 7 and 7a, resulting in more electric current being generated.

DETAILED DESCRIPTION—FIG. 6

FIG. 6 depicts an electric motor with a rotor 7 attached to a shaft 23, together with communicator 45, connecting elements 46, and flotation devices 8 and 11. The center shaft 23 is held in place by bearings 22 and 24. Motor brushes 44 are connected to the electric power source 43 and communicator 45. The communicator 45 is connected to the rotor 7 by electric conductors 46.

OPERATION—FIG. 6

Applying electric power from input 43 to the rotor 7 produces a magnetic field that generates rotational energy in the shaft 23. Attached buoyancy devices 8 and 11 floating in the vessels 9 and 12 exert upward pressure on the shaft 23 that reduces the load on the bearings 22 and 24, which permits larger magnets to be installed on the rotor 7, resulting in more electric current being generated.

CONCLUSIONS, RAMIFICATIONS, AND SCOPE

The addition of buoyancy means to devices that rely on rotational energy increases efficiency and stability. Devices that will benefit include but are not limited to electric generators, motors, turbines, and pumps.

The above description contains many specificities; these should not be construed as limitations on the scope of the invention, but as exemplifications of the presently preferred embodiments thereof. Other ramifications and variations are possible within the teachings of the invention.

The invention claimed is:

1. A rotor comprising:
   a cylinder;
   at least one bearing means to allow said cylinder to rotate freely;
   a support structure for said at least one bearing means;
   at least one flotation means attached to said cylinder;
   at least one flotation chamber means capable of suspending said at least one flotation means;
   whereby said flotation means reduces friction and vibration, and
   whereby efficiency is increased and maintenance costs are reduced.

2. The said cylinder as claimed in claim 1 further comprising at least one array of blades attached Within said cylinder, whereby a turbine is created.

3. The said cylinder as claimed in claim 1 further comprising at least one rotational energy connecting element attached to said cylinder; wherein said at least one rotational energy connecting element is at least one gear; whereby providing a means to transfer rotational energy.

4. The said cylinder as claimed in claim 1 further comprising at least one array of magnets attached to the outside surface of said cylinder.

5. The said cylinder as claimed in claim 4 further comprising at least one stator positioned in close proximity to said at least one array of magnets, whereby an electric generator is created.

6. The said cylinder as claimed in claim 4 further comprising at least one stationary coil of an electric conductor positioned in close proximity to said at least one array of magnets and connected to an electric power source, whereby an electric motor is created.

7. The at least one array of magnets as claimed in claim 4 wherein said at least one array of magnets are electromagnets, whereby greater efficiency is achieved.

8. The support structure as claimed in claim 1 further comprising at least one shroud to cover the cylinder end and bearing means; whereby the rotor components are protected and a means of attaching accessories is provided.

9. A rotor comprising:
   an axle;
   at least one bearing means to allow said axle to rotate freely;
   a support structure for said at least one bearing means;
   at least one flotation means attached to said axle;
   at least one flotation chamber means capable of suspending said at least one flotation means;
   whereby said flotation means reduces friction and vibration, and
   whereby efficiency is increased and maintenance costs are reduced.

10. The said axle as claimed in claim 9 further comprising at least one rotational energy connecting element attached to said axle; wherein said at least one rotational energy connecting element is at least one gear; whereby providing a means to transfer rotational energy.

11. The said axle as claimed in claim 9 further comprising a turbine attached to said axle; whereby rotational energy is provided.

12. The said axle as claimed in claim 9 further comprising at least one attached cylinder; whereby a platform for mounting accessories is provided.

13. The said cylinder as claimed in claim 12 further comprising at least one array of magnets attached to the outside surface of said cylinder.

14. The said cylinder as claimed in claim 13 further comprising at least one stator positioned in close proximity to said at least one array of magnets, whereby an electric generator is created.

15. The said cylinder as claimed in claim 13 further comprising at least one stationary coil of an electric conductor positioned in close proximity to said at least one array of magnets and connected to an electric power source, whereby an electric motor is created.

16. The said at least one array of magnets as claimed in claim 13 wherein said at least one array of magnets are electromagnets, whereby efficiency is increased.

17. A method to increase the efficiency of rotors comprising:
   providing a rotor;
   attaching at least one bearing means to allow said rotor to rotate freely;
   providing a means of supplying rotational energy to said rotor;
   affixing at least one flotation means to said rotor;
   suspending said flotation means with attached rotor in a chamber containing a heavy fluid;
   whereby said flotation means reduces friction and vibration, and
   whereby efficiency is increased and maintenance costs are reduced.

18. The rotor as claimed in claim 17 further providing a means of transferring rotational energy.

19. The means of transferring rotational energy as claimed in claim 18 wherein said means of transferring rotational energy is at least one gear.

20. The means of transferring rotational energy as claimed in claim 18 wherein said means of transferring rotational energy is at least one array of magnets.

* * * * *